June 25, 1957   C. B. RICHEY   2,796,713
TRACTOR MOUNTED RECIPROCATING CUTTING ASSEMBLY
Filed Feb. 9, 1954   3 Sheets-Sheet 1
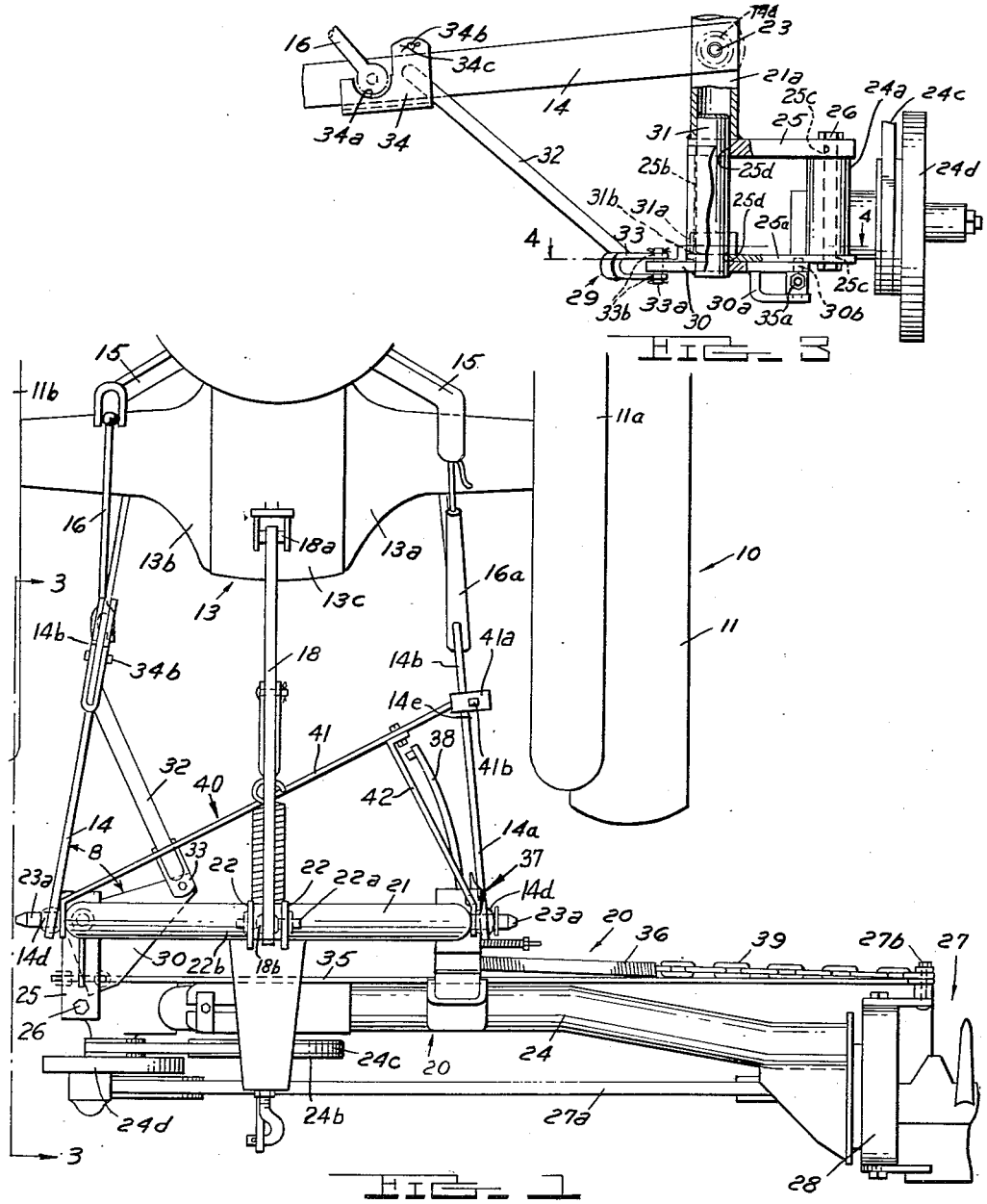
INVENTOR.
C. B. RICHEY
BY
ATTORNEYS June 25, 1957 C. B. RICHEY 2,796,713
TRACTOR MOUNTED RECIPROCATING CUTTING ASSEMBLY
Filed Feb. 9, 1954 3 Sheets-Sheet 2
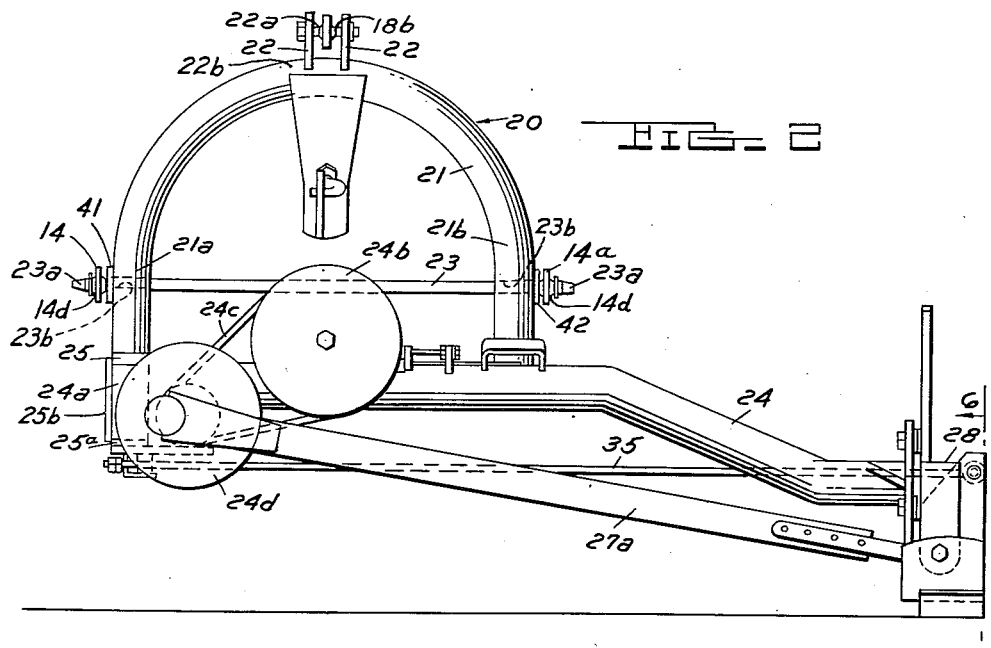
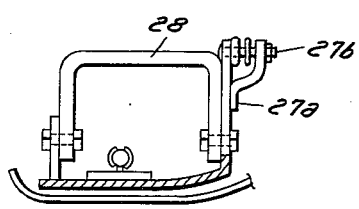
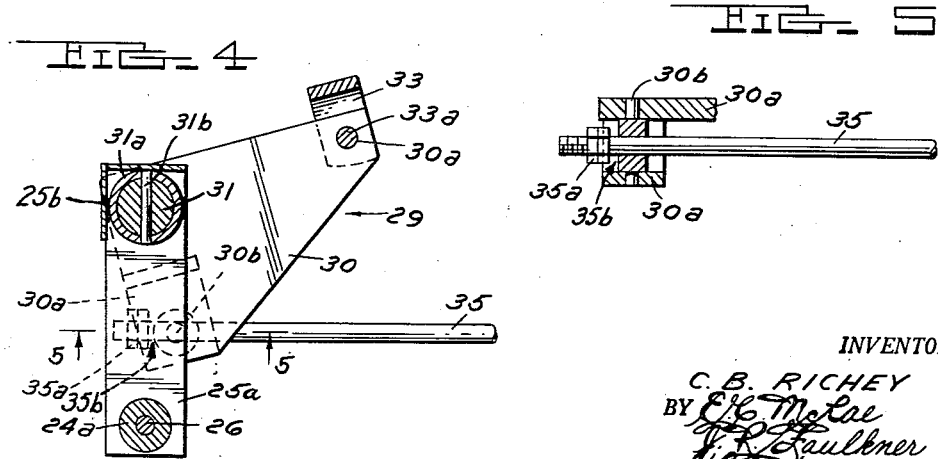
INVENTOR.
C. B. RICHEY
ATTORNEYS June 25, 1957　　　　C. B. RICHEY　　　　2,796,713
TRACTOR MOUNTED RECIPROCATING CUTTING ASSEMBLY
Filed Feb. 9, 1954　　　　　　　　　　　　3 Sheets-Sheet 3
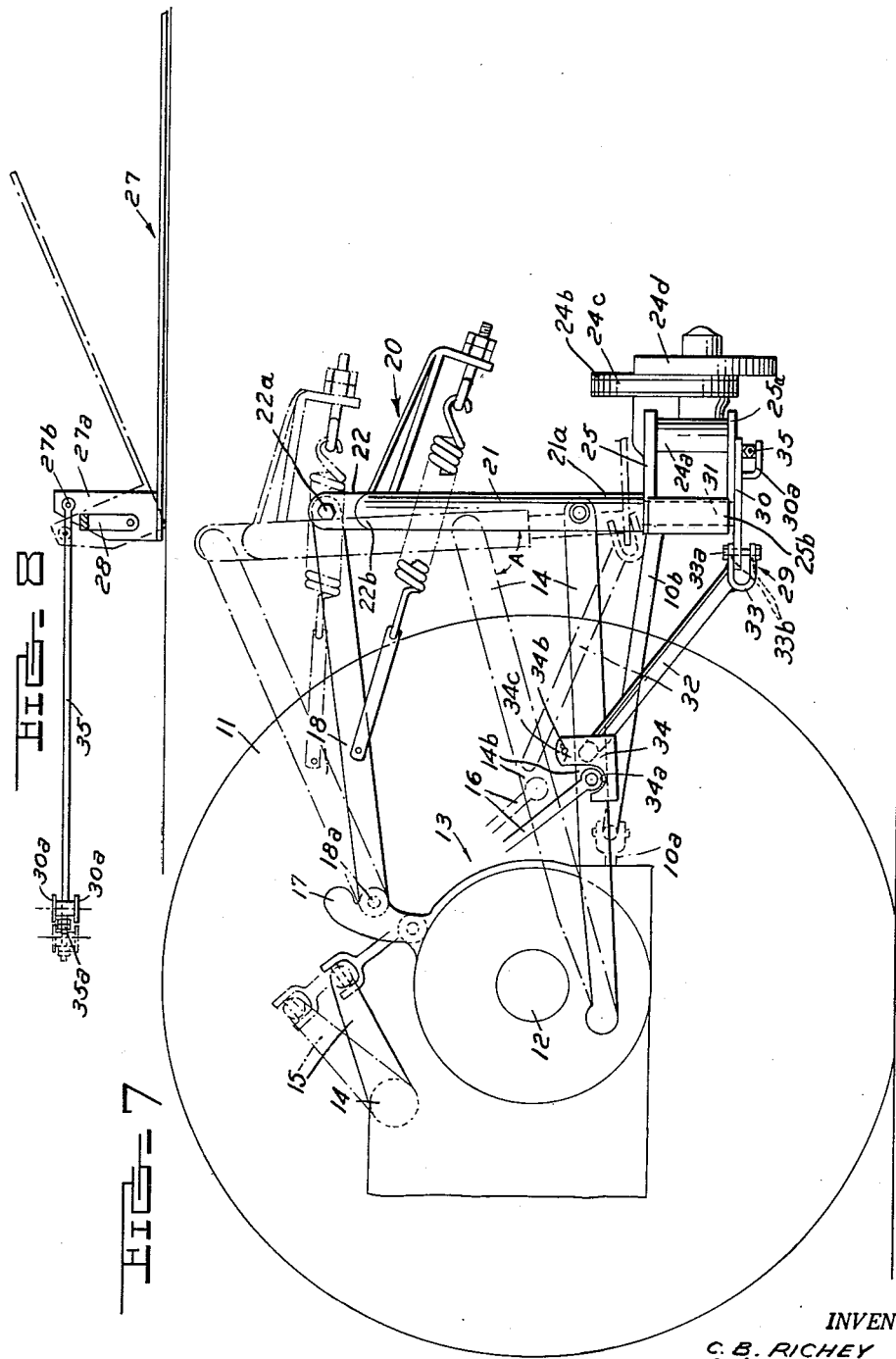
INVENTOR.
C. B. RICHEY
BY
ATTORNEYS

United States Patent Office 2,796,713
Patented June 25, 1957

2,796,713

TRACTOR MOUNTED RECIPROCATING CUTTING ASSEMBLY

Clarence B. Richey, Royal Oak, Mich., assignor to Ford Motor Company, Dearborn, Mich., a corporation of Delaware Application February 9, 1954, Serial No. 409,105

4 Claims. (Cl. 56—25)

This invention relates to an improved reciprocating knife type mower for use with tractors having power-lifted draft links.

In a more specific aspect, this invention relates to a cutter bar lift for tractor-mounted mowers, which automatically lifts the outer end of the cutter bar upon lifting of the mower by the tractor's draft links.

The cutter bar lift of the present invention is applicable to mowers which are mounted for operation on tractors having a pair of laterally spaced, trailing draft links and a top link pivoted on the tractor above said draft links. A typical mower of this type is disclosed in my U. S. Patent No. 2,637,966, issued May 12, 1953.

Agricultural mowers are subject to possible breakage and damage by stones, stumps and the like, hidden in a crop being cut. Notwithstanding these hazards, it is imperative that the cutting units operate in a ground-engaging position to provide complete crop removal. It is therefore desirable to provide such mowers with quick-responding means for lifting the cutter unit over obstructions. It is also desirable to provide such mowers with means for automatically lifting the cutting units when obstructions are encountered thereby, to prevent damage and contribute a long service life to such machines.

Accordingly, it is an important object of the present invention to provide a cutter bar lift for agricultural mowers of the type which are mounted for operation on tractors having trailing, power-lifted draft links.

Another object of the present invention is to provide a cutter bar lift for agricultural mowers which are mounted on tractors having power-lifted draft links, which automatically raises the outer end of the cutter bar as the mower is lifted by the tractor's draft links.

A further object of the present invention is to provide an improved cutter bar lift for agricultural mowers which are mounted on tractors having power-lifted draft links, wherein a thrust link is employed to impart a turning movement to a rotatable element mounted on the mower frame, by the relative change in angular relation of the mower frame with respect of one of the power-lifted draft links of the tractor, and such rotatable element effects a lifting of the outer end of the cutter bar from the ground concurrently with the raising of the mower by the draft links of the tractor. Furthermore, the cutter bar lift is so arranged as to be substantially unaffected by horizontal swinging "break-back" movement of the cutter bar support frame when the cutter bar encounters an obstruction.

A still further object of the present invention is to provide an improved cutter bar lift for tractor-mounted mowers wherein the cutter bar is supported in a semi-floating, ground-engaging relation during operation.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary plan view of a mower embodying the cutter bar lift of the present invention, showing the mower mounted on a tractor having a pair of trailing, power-lifted draft links.

Figure 2 is a rear elevational view of the mower shown in Figure 1.

Figure 3 is a fragmentary side view with parts broken away and shown in section, taken along the plane 3—3 of Figure 1.

Figure 4 is an enlarged section view taken along the plane 4—4 of Figure 3.

Figure 5 is a section view taken along the plane 5—5 of Figure 4.

Figure 6 is a section view taken along the plane 6—6 of Figure 2.

Figure 7 is a side view of Figure 1.

Figure 8 is a schematic view illustrating the lifting motion imparted to the outer end of the cutter bar by the present lift mechanism.

As shown on the drawings:

Numeral 10 refers generally to a tractor of well-known make having a pair of rear wheels 11 of which only one is shown on the drawings mounted on the ends of the rear axle 12 and partially confined within the fenders 11a and 11b, shown in part. Axle 12 is rotatably supported within a rear axle and differential housing 13. A pair of draft links 14 and 14a are pivotally secured at their forward ends to laterally spaced points on the rear axle housings 13a and 13b, adjacent the differential housing 13c. The upper portion of differential housing 13c is provided with a rotatable rock shaft 14c, which has a pair of rock arms 15 and 15a secured to its exposed ends. A pair of links 16 and 16a are respectively connected between the ends of rock arms 15 and 15a and medial points 14b on draft links 14 and 14a. A hydraulic cylinder and piston assembly (not shown) is built into the differential housing 13c for rotating the rock shaft 14c and an arcuate lifting movement is thereby imparted to the rock arms 15 and 15a for lifting the draft links 14 and 14a.

As best shown in Figure 7, a yoke 17 is pivotally mounted on the upper rear portion of differential housing 13c and a top link 18 has its forward end pivotally connected with said yoke by means of a pin 18a. The rear ends of draft links 14 and 14a and top link 18 are provided with conventional self-aligning hollow ball type connections 14d and 18b for attaching implements thereto and provide the well-known three-point implement suspension system.

The reciprocating knife type mower to which the present invention is illustrated as being applied is designated generally by the reference numeral 20 and includes an inverted generally V-shaped tubular main frame 21, upon which the remaining components of the mower are suitably mounted. Frame 21 is provided at its vertex 22b with a pair of laterally spaced, upstanding lugs 22. Lugs 22 are transversely apertured for the receipt of an attaching pin 22a for connection with the rear end of top link 18. The lower portion of frame 21 is provided with a transverse rod 23 which is welded into horizontally aligned apertures 23b formed in the arm portions 21a and 21b of frame 21. Rod 23 projects a short distance outwardly beyond each of the arm portions 21a and 21b of frame 21 and such projections 23a provide connection points by which the lower portion of said frame 21 is attached to the rear ends of draft links 14 and 14a.

With such frame construction, it is apparent that as the draft links 14 and 14a are raised or lowered, the angular relation between said draft links and the mower frame 21 will vary. This is more clearly shown in Figure 7 where the angle A between the draft link 14 and the frame 21 decreases as the mower is raised. In accordance with this invention, advantage is taken of this variance to produce a thrust upon a bell crank pivotally supported upon the main frame 21 for lifting the outer end of the cutter bar.

The left arm portion 21a of frame 21 is provided at its lower end by weldment means with a pair of vertically spaced and horizontally disposed, rearwardly extending lugs 25 and 25a. The lugs 25 and 25a are vertically spaced by an angle iron support 25b fixedly secured to both lugs. Lugs 25 and 25a are provided at their rear ends with vertically aligned apertures 25c for the reception of a pin 26. A laterally extending mower support bar 24 is provided at its left hand end with a bushing 24a which is journaled on the pivot pin 26. A conventional reciprocating knife type cutter bar unit 27 is pivotally mounted for movement in a substantially vertical plane on the free end of mower support 24 by means of an inverted U-shaped support yoke 28, Figure 6, adjustably secured to support 24. The structural details of the pivotal mounting of the mower support bar and the mounting of the cutter bar unit 27 upon said support bar are set forth in the aforementioned U. S. Patent No. 2,637,966, to which reference is made.

The cutter bar unit 27 is driven from the power take-off shaft of tractor 10. Such power take-off shaft 10a, Figure 7, extends rearwardly from the bottom part of the differential housing 13c. Mower support 24 is provided with a pulley 24b, adjustably journaled thereon, and such pulley is connected to the tractor power take-off shaft 10a by means of a universally jointed shaft assembly 10b. An eccentric 24d is also journaled upon the mower support member 24 and is drivingly connected with pulley 24b by means of a V belt 24c. A conventional pitman 27a operatively connects the eccentric 24d with the cutter bar unit 27.

The mower lift mechanism of the present invention is indicated by the numeral 29 and includes a bell crank 30 which is mounted for rotation in a substantially horizontal plane by being attached by weldment means to a vertically disposed, rotatable pin 31. Pin 31 is secured below the depending end of the left frame arm 21a between the forward ends of lugs 25 and 25a in aligned apertures 25d provided therein, and is held in position by a collar 31a secured to pin 31, above and adjacent the lower lug 25a by a straight pin 31b, Figures 3 and 4. A thrust link 32 is connected between bell crank 30 and the left draft link 14 of tractor 10 for actuating the present lifting mechanism. A U-shaped yoke 33 is welded to one end of the thrust link 32 and the arms of said yoke are provided with aligned apertures 33b through which a pin 33a is fitted for connection to bell crank 30 by means of an aperture 30c provided in the bell crank. The other end of the thrust link 32 is fitted with a U-shaped yoke member 34. Yoke 34 is provided with an upwardly opening notch 34a which is adapted to embrace the lower end of the connecting link 16 at its pivotal connection with the draft link 14. Yoke 34, during assembly, is fitted up around draft link 14 and the lower end of connecting link 16 and is secured in position by means of a pin 34b, passed through aligned apertures 34c provided in the ends of the arm portions of yoke 34. Thus yoke 34 is secured against longitudinal movement along draft link 14 and yet is provided with a limited amount of lateral pivotal movement to prevent binding of the parts of the lift 29 during operation. The upwardly opening yoke 34 also contributes to the quick and easy attachment of the mower 20 to the tractor for use.

The free arm of bell crank 30 is provided with a yoke 30a which has a transversely apertured pin 30b, vertically pivotally mounted between the arm portions thereof. As shown in Figure 5, a tension rod 35 has one of its ends passed through the aperture of the rotatable pin 30b and a nut 35a is threaded upon the end of said rod and abuts said pin to provide a lost motion connection generally indicated at 35b therewith. As shown in Figure 8, the cutter bar unit 27 is provided with an upstanding arm 27a which is bifurcated at its upper end for the receipt of a bolt 27b. Tension rod 35 has an eye formed on the free end thereof and is connected thereby to the bolt 27b, for lifting the outer end of the cutter unit 27 in a manner to be later described.

A coil tension spring 36 is hooked at its one end into the rear end of the arcuate guide bar 38 of the "breakback" or overload release mechanism indicated at 37. Spring 36 has its other end connected to a link chain 39 which in turn is fastened to the mower unit connection bolt 27b.

*Operation*

As was previously mentioned and as is shown by Figure 7, the angular relation between the draft links 14 and 14a of tractor 10 and the mower frame 21 changes as the mower is lifted and lowered by said draft links. This angular change is employed in the following manner in the present mower left mechanism. When the mower is lifted from the operating position shown in solid outline in Figure 7 to the raised position shown in phantom, the angle B (shown in Figure 1) between the thrust link 32 and the draft link 14 is slightly decreased, and the lower end 21a of the mower frame 21 is pulled slightly forward toward the rear axle and differential housing 13 of tractor 10. This effects a thrust upon link 32 which causes the bell crank 30 to be rotated in a clockwise direction as viewed in Figure 4. The movement of bell crank 30 is transmitted by connecting tension rod 35 to the lift arm 37a of cutter bar unit 27 to automatically lift the outer end of said cutter bar unit, as shown schematically in Figure 8, when the mower is lifted.

The configuration of the lifting mechanism 29 also provides for the lifting of the outer end of the mower unit 27 when an obstruction is encountered which causes the mower unit and the mower support member 24, to which it is attached, to "break-back," i. e., to swing rearwardly upon the vertical pivot axis 24a of support arm 24. This rearward swinging motion of mower support arm 24 does not effect any rotation of bell crank 30, since the bell crank is held in a fixed position by the thrust link 32. Therefore, as mower support 24 and mower unit 27 swing rearwardly, tension rod 35 is pulled to the right Figure 1, until the nut 35a, thereon, abuts the pivot pin 30b of bell crank 30. This action is effected during the initial swinging movement of the support 24 and the mower unit 27. Thereafter tension rod 35 is locked against longitudinal movement and as the mower unit and its support continue swinging rearwardly, the outer end of the mower unit is raised in the same manner described above for lifting the same through the medium of the upstanding lift arm 27b. In many instances when small obstructions such as stones are encountered the mower unit is lifted a sufficient amount to pass over the obstruction and avoid serious damage.

As shown in Figure 1, a stabilizer unit 40 can be used with the mower 20 by virtue of the non-interference of the lift unit 20 with the connection between the draft links 14 and 14a and the mower frame 21. The stabilizer 40 increases a transversely and forwardly extending strap member 41, which is apertured at its left end to fit upon the left mower frame hitch pin 23a, and is provided at its forward end with a horizontally disposed yoke 41a, adapted to embrace the right hand draft link 14a at a medial point 14e thereon. The arms of yoke 41a are provided with vertically aligned apertures for the receipt of a tapered pin 41b, whereby said yoke is releasably secured to the right hand draft link 14a. A second strap member 42 has its forward end bolted or welded near the right hand end of strap 41, adjacent the yoke 41a. This second strap extends rearwardly and is apertured to fit upon the right mower frame hitch pin 23a. The stabilizer unit 40 provides a triangularly braced structure from the trapezoidal tractor-implement connection represented by the laterally extending tractor rear axle and differential housing 13 and mower frame 21, and the longitudinally extending draft links 14 and 14a. The stabilizer 40 effectively limits lateral swinging motion of the mower in relation to the tractor, yet it is of such flexibility as to provide a vibration damping unit which limits the transmittal of mower vibrations to the tractor 10. Thus the tractor driver is effectively protected from mower vibrations, which, if allowed to be transmitted to the tractor, are extremely tiring and disconcerting to the driver.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A mowing implement for a tractor having a power-lifted trailing draft link and a top link, comprising, in combination, a rigid frame, pivot means on said frame for attaching said frame to said draft link and said top link, wherein the angular relation of at least part of said frame and said draft link varies as said draft link is moved in a vertical plane, a mower support member, pivot means secured to said mower support member at its inner end connecting said mower support member to said frame on a substantially vertical axis, a cutter bar unit, pivot means on said mower support member for attaching said cutter bar unit at its inner end to the outer end of said mower support member for movement in a substantially vertical plane, overload releasable means positioned on and between said mower support arm inner and outer ends normally holding said mower support and said rigid frame in operative relation, a bell crank pivotally supported on said frame for movement about a substantially vertical axis, said bell crank axis being in substantially longitudinal alignment with the pivot axis of said mower support, a thrust link pivotally connected at its one end to said bell crank and fixedly connected at its other end to a medial portion of said draft link, a tension member connected to the bell crank and to the inner end of said cutter bar unit, wherein the power lifting of said draft link lifts said rigid frame and changes the angular relation of at least part of said frame with said draft link and produces a thrust on said thrust link to rotate said bell crank and move said tension member to lift the outer end of said cutter bar unit, and wherein an obstruction encountered by said cutter bar unit will cause a release of said overload releasable means and a horizontal swinging of said mower support about its vertical axis without changing the angular relation of at least a part of said frame and said draft link and without substantial movement of said bell crank, and a concomitant lifting of said cutter bar unit to clear the obstruction.

2. A mowing implement for a tractor having a power-lifted, trailing draft link and a top link, said links being mounted for pivotal lifting and lowering movement; said implement comprising, in combination, a mower frame including a generally vertically extending main frame, means for pivotally connecting said draft link and said top link to the main frame, the angular relation of at least part of the main frame and the draft link varying as the draft link is lifted, a cutter bar unit, pivot means on the frame for attaching the inner end of the cutter bar unit to the mower frame for lifting of the cutter bar unit in a substantially vertical plane, a rotatable element pivotally mounted on the frame, a thrust link pivotally connected at one end thereof to the rotatable element and connected at the other end with a medial portion of the draft link, and a tension member connected between the rotatable element and the cutter bar unit above the pivot, power-lifting of the draft link lifting the frame and also changing the angular relation of the draft link and a portion of the frame so as to produce a thrust on the thrust link, rotate said element, and actuate said tension member to lift the outer end of the cutter bar about the cutter bar pivot.

3. A mowing implement for a tractor having a power-lifted, trailing draft link and a top link, said links being mounted for pivotal lifting and lowering movement; said implement comprising, in combination, a mower frame including a generally vertically extending main frame, means for pivotally connecting said draft link and said top link to the main frame, the angular relation of at least part of the main frame and the draft link varying as the draft link is lifted, a cutter bar unit, pivot means on the frame for attaching the inner end of the cutter bar unit to the mower frame for lifting of the cutter bar unit in a substantially vertical plane, a bell crank pivotally mounted on the frame, a thrust link pivotally connected at one end thereof to one arm of the bell crank and connected at the other end with a medial portion of the draft link, and a tension member connected between a second arm of the bell crank and the cutter bar unit above the pivot, power-lifting of the draft link lifting the frame and also changing the angular relation of the draft link and a portion of the frame so as to produce a thrust on the thrust link, rotate said bell crank, and actuate said tension member to lift the outer end of the cutter bar about the cutter bar pivot.

4. A mowing implement for a tractor having a pair of laterally spaced power-lifted, trailing draft links and a top link, said links being mounted for pivotal lifting and lowering movement; said implement comprising, in combination, a generally vertically extending main frame of inverted V configuration, means for pivotally connecting said draft links and said top link to the main frame, the angular relation of the main frame and the draft links varying as the draft links are lifted, a transversely extending mower support bar mounted on the main frame, a cutter bar unit, a horizontally extending pivot on the mower support bar supporting the inner end of the cutter bar unit for lifting thereof in a substantially vertical plane, a bell crank pivotally mounted on the frame, a thrust link pivotally connected at one end thereof to an arm of the bell crank and connected at the other end with a medial portion of the draft link, and a tension member connected between a second arm of the bell crank and the cutter bar unit above the pivot, power-lifting of the draft link lifting the frame and also changing the angular relation of the draft links and the main frame so as to produce a thrust on the thrust link, rotate the bell crank, and actuate said tension member to lift the outer end of the cutter bar about the cutter bar pivot.

References Cited in the file of this patent

UNITED STATES PATENTS

| | | |
|---|---|---|
| 2,550,412 | Girardi | Apr. 24, 1951 |
| 2,637,966 | Rickey | May 12, 1953 |